United States Patent
Krishnan (10) Patent No.: US 7,251,594 B2
(45) Date of Patent: Jul. 31, 2007

(54) EXECUTION TIME MODIFICATION OF INSTRUCTION EMULATION PARAMETERS

(75) Inventor: Sivaram Krishnan, Los Altos, CA (US)

(73) Assignee: Hitachi, Ltd., Tokyo (JP)

( * ) Notice: Subject to any disclaimer, the term of this patent is extended or adjusted under 35 U.S.C. 154(b) by 673 days.

(21) Appl. No.: 10/029,497

(22) Filed: Dec. 21, 2001

(65) Prior Publication Data
US 2003/0130834 A1    Jul. 10, 2003

(51) Int. Cl.
*G06F 9/455* (2006.01)
(52) U.S. Cl. .......................... 703/26; 717/138
(58) Field of Classification Search .................. 703/26; 717/138
See application file for complete search history.

(56) References Cited

U.S. PATENT DOCUMENTS

| | | | |
|---|---|---|---|
| 4,783,738 A | 11/1988 | Li et al. | |
| 5,794,062 A * | 8/1998 | Baxter | 712/30 |
| 5,794,063 A | 8/1998 | Favor | |
| 5,826,073 A | 10/1998 | Ben-Meir et al. | |
| 5,832,205 A * | 11/1998 | Kelly et al. | 714/53 |
| 5,920,713 A | 7/1999 | Favor | |
| 6,035,374 A | 3/2000 | Panwar et al. | |
| 6,115,809 A * | 9/2000 | Mattson et al. | 712/239 |
| 6,122,638 A | 9/2000 | Huber et al. | |
| 6,195,744 B1 | 2/2001 | Favor et al. | |
| 6,205,537 B1 * | 3/2001 | Albonesi | 712/43 |
| 6,240,502 B1 | 5/2001 | Panwar et al. | |
| 6,557,156 B1 * | 4/2003 | Guccione | 716/17 |
| 2002/0147969 A1 * | 10/2002 | Lethin et al. | 717/138 |

OTHER PUBLICATIONS

Altman, Erik R.; Kaeli, David; Sheffer, Yaron; "Welcome to the opportunities of Binary Translation", Mar. 2000, IEEE Computer.*
Conte, Thomas M.; Patel, Burzin A.; Cox, J. Stan; "Using Branch Handling Hardware to Support Profile-Driven Optimization", 1994, Proceedings of the 1994 27th annual international symposium on microarchitecture.*
Wall, David W.; "Global Register Allocation at Link Time", Oct. 28, 1986, www.hpl.hp.com/techreports/Compaq-DEEC/WRL-86-3.html.*
Brian Fahs et al., "Performance Characterization of a Hardware Mechanism for Dynamic Optimization", Dec. 2001, Proceedings of the 34th annual ACM/IEEE international symposium on Microarchitecture, pp. 16-27.*

(Continued)

*Primary Examiner*—Paul Rodriguez
*Assistant Examiner*—Russ Guill
(74) *Attorney, Agent, or Firm*—Squire, Sanders & Dempsey LLP (57) ABSTRACT

To improve computer performance, problems of emulation such as WAR hazard, uneven utilization of machine resources, unnecessary dependencies, wasted hardware resources and data buffer pollution, are alleviated by responding to dynamic execution information, such as branch prediction, register usage, overflow, a history of branch predictions of groups of branches combined, and a history of register usage for: dynamically modifying instruction parameters of an emulation sequence of instructions; reordering emulated instructions; and adding or changing the dynamic execution information.

8 Claims, 3 Drawing Sheets

OTHER PUBLICATIONS

Thomas Kistler et al.; "Continuous Program Optimization: Design and Evaluation", Jun. 2001, IEEE Transactions on Computers, p. 549-566.*

David A. Patterson et al., "Computer architecture A Quantitative Approach", second edition, 1996, Morgan Kaufmann Publishers, pp. 229-235, 262-271.*

Andrew S. Tanenbaum, "Structured Computer Organization", second edition, 1984, Prentice-Hall, pp. 10-12.*

Burke et al.; "The Jalapeno Dynamic Optimizing Compiler for Java", 1999, Proceedings of the ACM 1999 Conference on Java Grande, pp. 129-141.*

Arnold et al.; "Adaptive Optimization in the Jalapeno JVM", 2000, Conference on Object Oriented Programming Systems and Languages, pp. 47-65.*

Ramesh Radhakrishnan et al,; "Improving Java Performance Using Hardware Translation", June 2001, Proceedings of the 15th International Conference on Supercomputing, pp. 427-438.*

* cited by examiner

EXECUTION TIME MODIFICATION OF INSTRUCTION EMULATION PARAMETERS

BACKGROUND OF THE INVENTION

The present invention relates to emulation of instructions for execution by an instruction processor, in a computer environment.

An instruction, in digital computer operations, is a set of bits defining an operation. The instruction may comprise an operation code specifying the operation to be performed, one or more operands or their addresses, and one or more modifiers or their addresses (to modify the operand or its address). An instruction set, also called an instruction code, comprises symbols and characters that compose the syntax of a computer programming language, and in a computer's basic machine code, the part that specifies how characters or digits are used to represent the codes within the machine's instruction set.

Processors often emulate instructions, so that a first computer system may behave in the same manner as a second computer system, for instructions that are not directly implemented in the first system. Examples of such emulation include 1) running Java byte codes on a general purpose computer, e.g. so that a general purpose computer can run Java software written for another machine, to provide a Java virtual machine, 2) supporting instructions of a different instruction set architecture for compatibility reasons, and 3) operating a microprocessor as a terminal of a network in order to communicate with mainframes. Emulation includes a computer, device, program or combination thereof imitating the function of another computer, device, program or combination thereof. The emulation may be done in hardware or firmware or software or some combination thereof, such hardware or software or firmware or combination thereof being an emulator.

Known microprocessors emulate instructions outside of their architectures through emulation. Emulation through hardware is considerably faster than emulation through software. When hardware emulation is used, the instruction that is being emulated is often "translated" into an instruction emulation sequence of one or more instructions in the native instruction set of the CPU being used (such native instruction set comprising the instructions that have been implemented) and this translated sequence of native instructions is then executed. The translation sequence, that is the instruction emulation sequence, is fixed (as opposed to dynamic), as the details of emulation for each instruction that needs to be emulated is known at design time.

Translation of an instruction from one language to another is performed by compilers, assemblers and interpreters, for example.

SUMMARY OF THE INVENTION

The present invention analyzes problems, identifies and analyzes causes of the problems, and provides solutions to the problems. This analysis of the problems, the identification and analysis of the causes, and the provision of solutions are each a part of the present invention and will be set forth below.

The invention identifies and analyzes problems of emulation such as uneven utilization of machine resources, unnecessary dependencies, wasted hardware resources, overflow, and data buffer pollution. The invention provides the solution of dynamically modifying the emulation sequence, particularly the parameters of instructions in the sequence. Such modifying is in response to dynamic execution information obtained by executing an emulated sequence of instructions. The dynamic execution information may be provided by a module, like a branch predictor, with a prediction modified by the present invention.

The prior art fixed nature of a hardware translation emulation sequence is identified by the inventor as causing an uneven utilization of machine resources. For example, some out of many temporary registers are repeatedly used while others are not used. This uneven utilization has been analyzed and found to lead to unnecessary dependencies that affect performance. For example when one register is repeatedly used for temporary values due to emulation, the instructions that depend upon those values must be executed before the register value is changed and thus the use of out-of-order machines and parallel or multi processing use is limited. Stall or Write-After-Read (WAR) hazard may occur. Resolving such dependencies according to the prior art can potentially waste hardware resources, for example a register renaming resource. Also such dependencies of the emulated sequence may require that multiprocessing, out-of-order processing, etc. not be used.

Conventional emulation sequence generation can have undesirable side affects like polluting data buffers. For example, when a data buffer is rewritten due to emulation, the data buffer is polluted if the thus destroyed value is needed in a subsequent instruction, whose execution will thereby try to use a value from the data buffer that has been displaced.

This invention alleviates some of the above-mentioned problems by dynamically (i.e. in response to dynamic execution information generated during the emulation or execution of the emulated sequence of instructions, as opposed to at the time of architecture design) modifying the emulation instruction sequence, for example modifying parameters of the emulated sequence of instructions or changing instruction scheduling or adding with overflow or changing a branch prediction or allocating temporary registers from a pool of registers. Such modification may include the changing of the sequence or scheduling of instructions or instruction clusters, changing the order of clusters, and changing the sequence of parameters. The cost for implementing the dynamic modifying of parameters is reasonable and the benefit is commensurate with the design support.

The embodiment describes the use of dynamic execution information to generate improved and optimal instruction emulation sequences. Examples of such dynamic execution information are dynamic branch prediction information, overflow and temporary register allocation. The dynamic execution information may come from an historical state of the resources such as registers as to their use and cycling, or from a branch prediction state machine that keeps a long history of branches at particular addresses and a long history of branches taken and not taken to set likely and unlikely flags or condition codes for each of the branches or in consideration of the flags of a group of branches, or from a resource usage that determines overflow error.

A branch prediction guesses whether a branch will be taken in a program and fetches code accordingly. When a branch is taken, the next instruction of the branch sequence is stored in fast memory, such as a cache, and the "next instruction" is therefore ready to be removed from such fast storage to be used the next time a branch, which may or may not be the same branch, is encountered, to thereby predict which way the instruction will branch, which prediction is correct about 90% of the time.

U.S. Pat. No. 6,115,809 discloses branch prediction for separate caching of instructions according to a classification of either strong or weak likelihood of branching, for either fixed or dynamic prediction. Although this patent does not relate to emulation, this patent could be used to predict which path will be taken among four possible paths defined by two successive branches, for example, and provide multiple condition codes for branching, prediction flags in the patent. The disclosure is incorporated herein for an implementation of a branch predictor.

Until an operation is completed, in the prior art, a parameter is effectively treated as a constant value by the program. The embodiment dynamically changes the parameters in the emulation sequence during emulation, to improve performance. A parameter, as an example of a dynamic execution information, is a value that is given to a variable, for example at the beginning of an operation or before an expression is evaluated. A parameter can be text, a number, or an argument name assigned to a value that is passed from one routine to another. Examples of such parameters are register fields within instructions. Parameters can customize program operation.

In certain cases, dynamic execution information and dynamic modifying of parameters is used to overcome hardware restrictions. An example is the use of multiple condition codes, even though the architecture does not provide for this. A condition code is one of a set of bits that are set as the result of previous machine instructions, and they are hardware-specific. Condition codes include carry, overflow, zero result, and negative result code. A particular condition code may produce a conditional branch, a conditional jump or a conditional transfer, for example.

In the embodiments, execution may be actual or virtual to provide the dynamic execution information. For example, virtual execution may be on a virtual machine (Java code using a sandbox, e.g.) where there is no access to the file system of a computer or computers on which they are executing. Further, examples of emulated sequences of instructions include not only being in the instruction set of the executing computer but also runable with such instruction set, for example when in a cross-platform programing language such as Java. Thus emulation could translate from or into Java, for example.

BRIEF DESCRIPTION OF THE DRAWING

The present invention is illustrated by way of embodiments and examples in the figures of the accompanying drawings and in which like reference numerals refer to similar elements. Further objects, features and advantages of the present invention will become more clear from the following detailed description of a preferred embodiment and best mode of implementing the invention, as shown in the drawing, wherein.

DETAILED DESCRIPTION

The invention dynamically changes at least a component of a computer system that generates an emulated sequence of instructions, to improve performance.

Still other aspects, features and advantages of the present invention are set forth in the following detailed description, of a particular embodiment, including the best mode contemplated for carrying out the present invention, along with specific examples of sequences of instructions. The present invention is capable of implementation in other and different embodiments, and its details can be modified in various respects, all without departing from the spirit and scope of the present invention. Accordingly, the drawing and description are to be regarded as illustrative in nature, and not as restrictive.

Although, this embodiment is described using a specific known microprocessor instruction set as input to the emulator and a specific known different microprocessor instruction set as output, the invention may be used in other environments.

A computer system, emulation method, computer readable medium with data for emulation, and an emulator for generating an emulated sequence of instructions are described, for the purposes of explanation, with specific details, in order to provide a thorough understanding of the present invention. However, one skilled in the art may practice the present invention without these specific details or with equivalents. Well-known structures and devices are shown in block diagram form in order to avoid unnecessarily obscuring the present invention.

Figure 2:
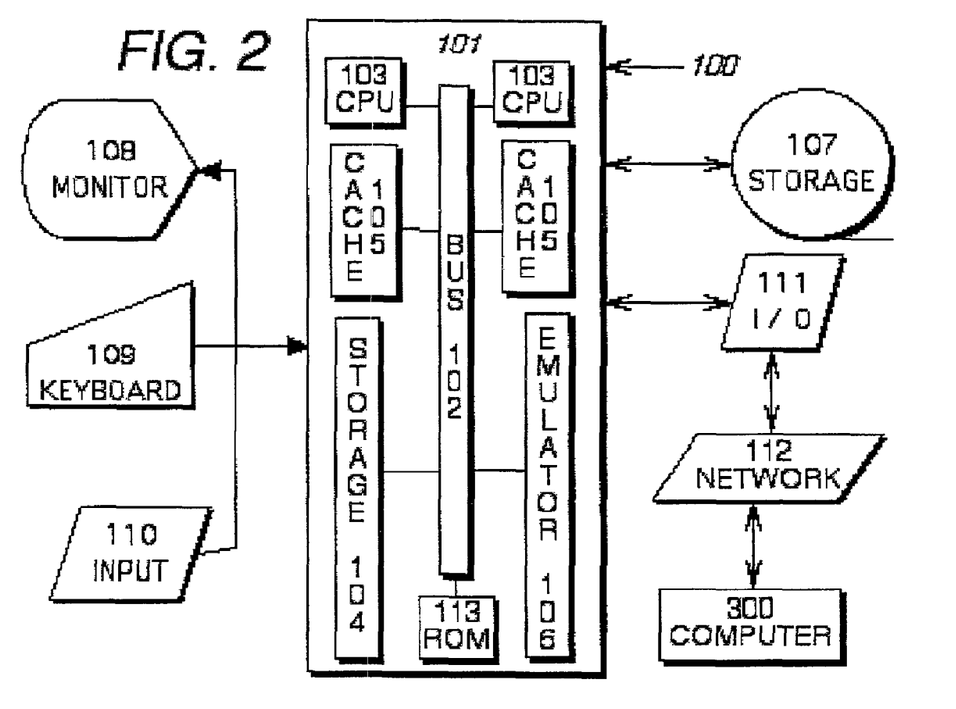
FIG. 2 shows a computer system using the emulator of FIG. 1 in combination to implement an embodiment of the present invention.

FIG. 2 illustrates a computer system 100 as an embodiment according to the present invention. A computer (for example a micro-, mini-, super-, super scalar-, multi-and out-of-order-processor) 101 includes: a bus 102 communicating information among one or more processors 103 (e.g. a CPU) and ROM 113 that stores static information and instructions for the processor 103; main memory or storage 104, such as a random access memory (RAM) or other dynamic storage device, coupled to the bus 102 for storing information and instructions to be executed by the processor 103; and one or more cache memories 105, which may be on a single chip with one or more of the processors 103 and/or coupled with a processor by the bus 102. When the computer system 100 has more than one of the processors 103, the computer may be referred to as a multiprocessor or a computer with superscalar architecture. The main memory or storage 104 and one or more cache memories 105 are used for storing temporary variables in registers Rn and temporary registers TR0, or for storing other intermediate information during execution of instructions and emulation by the processor/s 103. The main memory 104 is used for storing the program or code to control operation of and be a part of the emulator 106, or the emulator 106 may be firmware in the read only memory ROM 113. The emulator 106 may be hardware on a card or a board.

A magnetic disk or optical disk or other type of peripheral storage 107, having computer readable media is coupled to the computer 101. A display 108 such as a cathode ray tube (CRT) or liquid crystal display (LCD) or plasma display, an input device 109 such as a keyboard and/or mouse, and any other input 110 are coupled to the computer 101.

A general purpose input/output port (I/O) 111 couples the computer 101 with other structure, for example with the network 112, which is a LAN, WAN, WWW, or the Internet, or the like, to which is coupled another similar computer system 300, so that the computer system 100 may emulate the instruction set of the computer system 300, or vice versa. An original instruction sequence to be emulated is read into main memory 104, for example, from another computer system 300 or from a computer readable medium, such as storage 107. Thus the computer system for emulation may be local or distributed.

The execution may be for an end use (preferred embodiment) or only to produce an emulated sequence of instructions that is then stored for subsequent end use execution. In the preferred embodiment, emulation is provided by the computer system 100 during execution of an original sequence of instructions, that is, emulation and execution are effectively being conducted on a real-time or run-time basis, or substantially simultaneously. The execution and emulation may be in different computer systems or conducted with different processors in the same computer system or conducted on a single processor. The execution of the original and emulated sequence of instructions produces dynamic execution information from software or resource usage or external hardware/software, which information is dynamically used by the emulator in generating or modifying the emulated sequence of instructions, as will be described below with respect to FIG. 1 in more detail. This information can be stored in temporary or hidden registers or other memory.

The I/O 111 provides two-way data communication coupling to the network 112. The I/O may be a digital subscriber line (DSL) card or modem, an integrated services digital network (ISDN) card, a cable modem, a telephone modem, a cable, a wire, or wireless link to send and receive electrical, electromagnetic, or optical signals that carry digital data streams representing various types of information, including instruction sequences. The communication with peripherals may include, for example, a Universal Serial Bus (USB) or a PCMCIA (Personal Computer Memory Card International Association) interface.

Various forms of computer-readable media may carry emulation code to transform a general purpose computer into a special purpose computer that will thereby include the emulator of the present invention. For example, the emulation instructions for carrying out at least part of the present invention may initially be on RAM 104, ROM 113, magnetic disk 107, optical disc 107, flash memory 107, cache 105 or the like computer-readable media of a storage 104 locally associated with the processor 103 or to be transmitted to a remote computer 300. The invention includes emulation instructions on a computer readable medium and as a data stream signal.

Figure 1:
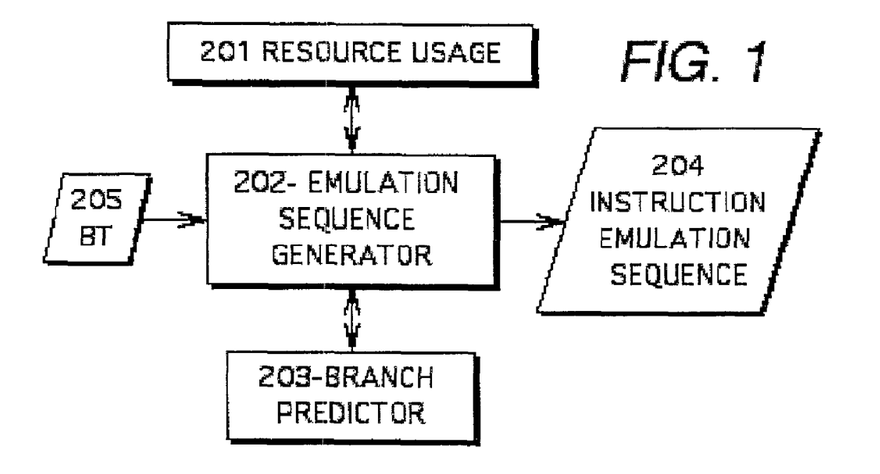
FIG. 1 is a schematic of a hardware and/or software and/or firmware emulator of the present invention, with an input sequence of instructions and an output emulated sequence of instructions.

With reference to FIG. 1, an input instruction 205 is, by way of example, a BT instruction, which is a conditional branch to a target address (computed using a personal computer or PC relative offset, #disp), if the branch condition is true. The syntax for the BT instruction (an original instruction from an original sequence of instructions to be emulated) is:

EXAMPLE 1

| LINE | INSTR. | OPERAND ETC. |
|---|---|---|
| Line 1 | BT | #disp |

In sequences of instructions to follow, the instructions are written top to bottom in the order in which such instructions are executed. A first column of line numbers is added only for reference purposes herein. A second column provides the instruction operation codes (OP CODE), which specifies the operation to be performed. A third column (OPERAND ETC.) specifies one or more operands or their addresses and one or more modifiers or their addresses (to modify the operand or its address). A fourth column (FLAG) specifies the likely flag content or condition code provided by the branch predictor 203.

The emulated sequence of instructions obtained by emulation of the EXAMPLE 1, which emulation is according to the prior art, is:

EXAMPLE 2

| LINE | OP CODE | OPERAND ETC. | FLAG |
|---|---|---|---|
| Line 1 | PT | #disp, TR0 | // likely |
| Line 2 | NOP | | |
| Line 3 | BNE | R19, R63, TR0 | // likely |

NOP is a no operation instruction. BNE is a conditional branch instruction. TR0 is a temporary register used for the PT instruction that requests a prefetch. R19, R63 and TR0 refer to specific registers and their contents, which may hold operands and modifiers used during the PT instruction operation or execution. Since the example original BT instruction has a provision to indicate if control is transferred to a branch target as well as static branch prediction, the default branch prediction in the EXAMPLE 2 is that both the PT instruction and the BNE instruction are considered "likely" to branch.

This invention includes the identification and analysis of problems and their causes of statically determined emulation sequences of the prior art, some of which problems and causes, as illustrated by examples, are:

Problem/Cause 1. Since the "likely" flag is always asserted for the PT instruction, it is possible that the branch target was fetched unnecessarily, which wastes memory bandwidth.

Problem/Cause 2. Similarly since the BNE instruction is always considered "likely" for all branches (including those known to be rarely taken), there is a substantial chance of misprediction, which wastes execution cycles.

Problem/Cause 3. TR0 is the temporary register for all BT instructions. A temporary register is a memory, such as a cache, that is used by a program or operating system to hold work in progress temporarily. The temporary register is needed only until the current session is terminated, at which time the contents may be saved in another storage or may be discarded. When there are two BT instructions in a loop or recursive call, which is very common, temporary register TR0 is used repeatedly, that is the same register is used for successive BT sessions. In such a case, a target instruction in the buffer of temporary register TR0 for one branch (the first executed BT instruction) is likely to be replaced by a different target instruction of another branch (the second BT instruction). In a loop and a recursive execution, this replacement takes place repeatedly, using execution cycles for the replacements in the iterations and invocations. The inventor has determined that the elimination of the thus identified cause, that is the replacements, will eliminate the corresponding wasted execution (machine) cycles and therefore speed up the overall execution of the emulated BT instruction.

Problem/Cause 4. The reuse of the temporary register TR0 causes difficulty in superscalar processors wherein the processor superscalar architecture enables multiple instructions to be executed simultaneously for each clock cycle. Superscalar or substantially simultaneous execution of two BT instructions is difficult and uses machine cycles to keep track of whether the current content of temporary register TR0 is applicable to the first or second BT instruction. When the content of temporary register TR0 is needed in one machine cycle for execution of both BT instructions, it would appear impossible to prevent an error according to the prior art. The reuse of temporary registers causes false dependencies, requiring these registers to be renamed in order to relate the content to a particular code execution. This may lead to sub-optimal use of the renaming resources. In systems that do not support hardware register renaming, such instructions with false dependencies may be stalled unnecessarily. The inventor has determined that the elimination of the thus identified and analyzed cause, will eliminate the corresponding execution (machine) cycles previously needed and therefore speed up the overall execution of the instruction, eliminate stalls and eliminate errors. Also the elimination of a need to use a renaming resource will speed up the operation and eliminate a need for a renaming resource.

Problem/Cause 5. The reuse of the temporary register TR0 causes difficulty in out-of-order issue machines, where instructions may be executed out-of-order to avoid unnecessary stalls. It is difficult to keep track of whether the content of temporary register TR0 is applicable to the first or second BT instruction for any one machine cycle, thus requiring wasting machine cycles to keep track of register usage. The reuse of temporary registers causes false dependencies, requiring these registers to be renamed in order to relate the content to a particular code execution. This may lead to sub-optimal use of the renaming resources. In systems that do not support hardware register renaming, such instructions with false dependencies may be stalled unnecessarily. The inventor has determined that the elimination of the thus identified and analyzed cause, will eliminate the corresponding execution (machine) cycles previously needed and therefore speed up the overall execution of the instruction, to eliminate stalls and to eliminate errors. Also the elimination of a need to use a renaming resource will speed up the operation and eliminate its requirement.

This invention includes multi-part solutions to the above identified problems, which solutions include:

Solution 1. The emulation of the embodiment is enhanced with dynamic, run-time information.

In FIG. 1, the emulation system has a new emulation sequence generator (in the example, implemented as hardware) 202 that receives an instruction 205, for example a BT instruction, as an input. The emulation sequence generator 202 is a state machine that generates the appropriate emulation sequence 204 at its output. The emulation sequence generator 202 is enhanced with dynamic, run-time information (that is, dynamic execution information) provided at inputs, from the resource usage 201 (a known component that may be a resource file that includes a resource map that indexes resource data, structures, templates, definition procedures, renaming procedures, management routines, icon maps and so forth associated with a particular resource, such as a menu, window, or dialog box, and in addition a new component that has new resources such as the historical register usage table and the historical branch prediction table, which will be described later with respect to the enhanced or improved embodiment) and the branch predictor 203 (a known component that will perform branch prediction and which is preferably hardware, and in addition one having new components such as the instruction group branch prediction, which will be described later with respect to the enhanced or improved embodiment), respectively. The components 201 and 203 are examples of components that may provide dynamic execution information as inputs to the emulation sequence generator 202.

The emulation sequence generator 202 may internally generate dynamic execution information through virtual execution or actual execution. For an example input instruction 205, the instruction address of the BT instruction is used in a branch predictor table of the branch predictor 203. The branch predictor 203 predicts whether the branch is to be taken or not according to known technology and issues a "likely" flag accordingly. The "likely" flag for the PT and BNE instructions are provided as dynamic execution information by the branch predictor 203 to the emulation sequence generator 202.

The "likely" flag is generated by the branch predictor 203 of the preferred embodiment on run-time information and therefore the prediction is not static or fixed, rather it is dynamic, which may also be through known technology. The invention is usable with dynamic execution information other than branch prediction of the example. With static branch prediction, prediction accuracy is between 50% and 90%. Dynamic branch predictors like that used in the embodiment are frequently well over 90% accurate. Any kind of branch predictor 203 may be used for branch prediction as one form of dynamic execution information, although a dynamic predictor is preferred. The design or absence of the branch predictor 203 does not affect the broad implementation of this invention that uses dynamic execution information in general to generate the instruction emulation sequence 204. As mentioned a new enhanced branch predictor is described later.

Solution 2. The new emulation of the embodiment keeps track of temporary registers TRn and registers Rn, where n is a whole number 0, 1, 2, . . . , for example as a hardware state machine. A new enhanced historical register usage table as a usage resource is described later.

The emulation sequence generator 202 maintains a list of temporary registers TRn and registers Rn, used in the instruction emulation sequence 204. An example list of temporary registers TRn is caller-save registers as defined by an ABI instruction or a subset thereof. The emulation sequence generator 202 uses heuristics (approaches or algorithms to find a correct solution of a programming task, non rigorous or self-learning) that determines which temporary register TRn or register Rn should be used by the emulation sequence generator 202 so as not to overwrite valid data already in a register.

The embodiment determines execution information as to which of the registers TRn, Rn have contents that may be used during the forthcoming execution of the emulated sequence of instructions (valid contents) and which of the registers TRn, Rn have contents that are not to be used during the forthcoming execution of the emulation sequence (don't care contents); the former are not rewritten and the later may be rewritten as needed. The naming or renaming of temporary registers and/or order of instructions in the instruction emulation sequence is dynamically changed according to the execution information to avoid register conflict.

Solution 3. The new emulation of the embodiment, keeps a record of branches and provides branch prediction codes or flags for each branch, as is known. A new enhanced historical branch prediction table as a dynamic execution information usage resource 201 or a state machine output of the branch predictor 203 is described later in more detail, but in general scripts or heuristics consider the branch predictions of plural branches together as a group to determine a new and additional branch prediction of the group, which new and additional branch prediction may be different from any members of the group.

As an example, consider the following original sequence of instructions 209:

EXAMPLE 3

| LINE | OP CODE | OPERAND ETC. | FLAG |
|------|---------|--------------|------|
| Line 1 | CMPEQ | R1, R3 | |
| Line 2 | BT | #displ | // likely |
| Line 3 | CMPEQ | R4, R6 | |
| Line 4 | BT | #disp2 | // unlikely |

CMPEQ is a compare instruction. The emulated sequence of instructions that would be produced from the EXAMPLE 3 by a prior art emulation sequence generator is:

EXAMPLE 4

| LINE | OP CODE | OPERAND ETC. | FLAG |
|------|---------|--------------|------|
| Line 1 | CMPEQ | R1, R3, R19 | |
| Line 2 | PT | #displ, TR0 | // likely |
| Line 3 | BNE | R19, R63, TR0 | // likely |
| Line 4 | CMPEQ | R4, R6, R19 | |
| Line 5 | PT | #disp2, TR0 | // likely |
| Line 6 | BNE | R19, R63, TR0 | // likely |

With the embodiment of the invention, the modified emulated sequence of instructions 204 produced from the EXAMPLE 4 prior art emulated sequence of instructions and produced by the emulation sequence generator 202 is:

EXAMPLE 5

| LINE | OP CODE | OPERAND ETC. | FLAG |
|------|---------|--------------|------|
| Line 1 | CMPEQ | R1, R3, R20 | |
| Line 2 | PT | #displ, TR0 | // likely |
| Line 3 | BNE | R20, R63, TR0 | // likely |
| Line 4 | CMPEQ | R4, R6, R19 | |

-continued

| LINE | OP CODE | OPERAND ETC. | FLAG |
|------|---------|--------------|------|
| Line 5 | PT.NT | #disp2, TR1 | // unlikely |
| Line 6 | BNE.NT | R19, R63, TR1 | // unlikely |

In the EXAMPLE 5 modified emulated sequence of instructions, the ".NT" is used to distinguish a second instruction, for example in line 5, from an identical OP CODE, in the example found in line 2. The branch predictor 203 provides even more sophisticated dynamic information than previously discussed, namely an additional flag condition of "unlikely", which improves run-time performance.

There are three important dynamic changes to the EXAMPLE 4 in producing the EXAMPLE 5, namely:

Change 1) the target register specified is different in lines 5 and 6, that is, the temporary register TR0 has been changed to temporary register TR1 in lines 5 and 6.

Change 2) the "likely" flag condition specified is different in lines 5 and 6, that is, for the two branch instructions in lines 5 and 6 the "likely" flag conditions have been changed to "unlikely".

Change 3) more than one condition code is created, namely "likely" and "unlikely".

The PT instruction requests a prefetch and the target instructions are brought into special buffers attached to each target temporary register TRn. In the EXAMPLE 4, the target instructions of the first branches of lines 2 and 3 are displaced by the target instructions of the branches of lines 5 and 6. When the EXAMPLE 4 is in a loop or a recursive call, there are many unnecessary or redundant instruction fetches. In the EXAMPLE 5, the target temporary register TR1 used in lines 5 and 6 is different from the target temporary register TR0 used in lines 2 and 3 and there is no clash. Therefore, with the embodiment, in accordance with the solution 2) above, upon an iteration of the sequence in the loop or upon a recursive invocation of the sequence, machine cycles to rewrite the temporary register TR0 twice per iteration or invocation as in the prior art EXAMPLE 4 are not necessary, because of the provision of multiple temporary registers TR0 and TR1 whose contents do not change during the iterations of the loop or the recursive invocations of the call. Therefore machine cycles are saved and the sequence executes faster with the embodiment than it does with the prior art.

Many computer architectures specify condition codes. These codes are typically used to describe status or conditions such as branch taken/not taken, overflow, carry, and negative.

As an example, a condition code may denote whether the result was negative of whether a branch should be taken. A single branch condition code bit is implicitly updated by all compare instructions (CMPEQ) and implicitly used by all conditional branch instructions, for example BNE.NT. This single resource, the branch condition code bit, is cause of a potential bottleneck problem. In the EXAMPLE 4 of prior art emulation, the first compare instruction CMPEQ of line 1 sets R19, the value of which is then used by the first branch BNE of line 3; the second compare-branch pair of lines 4 and 6, respectively, uses the same R19. In the EXAMPLE 5 of the embodiment, the first compare CMPEQ of line 1 sets R20, the value of which is then used by the first branch BNE of line 3; the second compare-branch pair of lines 4 and 6 uses R19. In effect, the instruction emulation sequence of the embodiment has created two condition codes even though the original architecture of the input instruction 205 and the second prior art instruction emulation sequence define only one. This means that with the EXAMPLE 5 of the embodiment, the second compare instruction can be moved ahead of the first branch safely as it does not destroy the register contents (in this case, R20) used by the branch.

As another example using an out-of-order issue machine, including a processor of instructions, instructions are often issued and executed out-of-order to allow independent instructions to go ahead of other stalled instructions. The out of order execution of instructions is possible only when there is no true data dependency between the instructions whose order is to be changed, that is when the instructions whose order is to be changed are independent instructions.

In EXAMPLE 4 of the prior art emulation, the second PT instruction of line 5 targets temporary register TR0. If this second PT instruction of line 5 were moved ahead, it is desirable that the first BNE instruction of line 3, which uses temporary register TR0, should not be affected. An out-of-order issue machine recognizes this data dependency of the second PT instruction of line 5 and the first BNE instruction of line 3 using the same target temporary register TR0 and the out-of-order issue machine might rename temporary register TR0 of line 5, if a renaming resource is available. If no renaming resource is available, the second PT instruction of line 5 is stalled to avoid a Write-After-Read (WAR) hazard.

In EXAMPLE 5 of the embodiment modified emulated sequence, the second PT instruction of line 5 targets temporary register TR1. Therefore, the second PT instruction of line 5 can be moved upward in the sequence across a much greater number of instructions than is the case with EXAMPLE 4, without the possibility of WAR, and then there is no renaming of registers necessary during running of the modified emulated sequence of instructions. Therefore the potential problem of stall of a WAR hazard is solved in the emulation sequence generator; and there is no requirement of a subsequent prior art solution after emulation and during the execution of a prior art emulated sequence of instructions. Such is another advantage of the present embodiment.

In the specific computer instruction set of the examples, there is a two-cycle latency between a PT instruction and a dependent branch, to be referred to as a PT-BR stall. The use of the target temporary register TR0 in line 2 of the EXAMPLE 5 of an embodiment modified emulated sequence, which is different from the target temporary register TR1 used in the second PT instruction (PT.NT) found in line 5, allows the second PT.NT instruction to be moved ahead, which thereby avoids the above-mentioned PT-BR stall and can run as an out-of-order sequence while avoiding unnecessary stalls and wasted cycles.

When the branch predictor 203 provides input to the emulation sequence generator 202 with specific dynamic execution information of the "likely" flag, the emulation sequence generator 202 modifies the emulation as needed to avoid the problems mentioned herein, to generate the modified emulated sequence of instructions 204 accordingly. In the EXAMPLE 5 of the embodiment, the first PT and BNE instructions of lines 1 and 4 respectively are marked "likely" while the second pair of PT.NT and BNE.NT instructions of lines 2 and 6, respectively, are marked "unlikely". This additional flag value, namely, "unlikely", improves run-time performance, particularly if a group of branches are considered together and two (or some number greater than two) or more "unlikely" flags of the group provide a new additional condition flag of the group as "likely". With even more sophisticated dynamic information available, the second PT.NT instruction of line 2, is flagged as "likely", while the second BNE.NT instruction of line 6 is flagged as "unlikely". The above-mention U.S. patent provides a means for providing multiple condition flags, which may be evaluated for a group of branches according to the present embodiment. This would prefetch the target instructions of the second PT.NT instruction; however, the branch is predicted to be "unlikely". This is useful to prefetch target instructions of those branches that are usually unlikely, but are guaranteed to be taken from time to time, and which if taken together with another "unlikely" branch as a group, the group has a higher likelihood than any member of the group so that the group as a whole becomes "likely".

Conventional emulation sequence generation can have undesirable side effects like polluting data buffers. For example, when a data buffer is rewritten due to emulation, the data buffer is polluted if the thus destroyed valid value is needed in a subsequent instruction, whose execution will later use a rewritten invalid value from the data buffer due to the pollution.

Overflow occurs when data resulting from executing a sequence of instructions requires more bits than have been provided in hardware or software to store the data. Examples of overflow involve floating-point operations where the result is too large for the number of bits allowed for the exponent, a string that exceeds the bounds of the array allocated for it, and an integer operation whose result contains too many bits for the register into which it is to be stored. In general, overflow occurs when a number resulting from some arithmetic operation is too large to be contained in the data structure that a program provides for it. Under such conditions, it is common in the prior art to have a usage resource produce dynamic execution information, such as setting an overflow error flag.

In the original sequence of instructions, there may be no problem of an overflow error. The inventor has determined that the emulated sequence of instructions as produced by the prior art may have an overflow problem that could not have been anticipated by the original programmer. The instruction emulation sequence of an example original instruction, ADDC, executable with a first instruction set, is:

EXAMPLE 6

| LINE | OP CODE | OPERAND ETC. | COMMENT |
| --- | --- | --- | --- |
| Line 1 | ADDC | R1, R2 | R1 + R2 + CARRY |

The above code involves the use of a hidden resource, a branch condition code bit, which by convention is stored in R29. Upon overflow, the branch condition code bit in register R29 is upgraded. An example of an emulated sequence of instructions executable in a second instruction set, obtained by translating EXAMPLE 6, according to the prior art, is as follows:

EXAMPLE 7

| LINE | OP CODE | OPERAND ETC. | COMMENT |
|---|---|---|---|
| Line 1 | ADDC | R1, R2, R3 | R1 + R2 + CARRY |

The above code uses three explicit registers and one implicit register R29. When there is an overflow, register R3 is corrupted if it contained valid data prior to the overflow. The setting of the overflow flag is dynamic execution information that is responded to by using the dynamic execution information of the historical record of register usage to modify the emulated sequence of instructions, which include the instructions of EXAMPLE 7, by allocating a currently unused register, for example R20 from the pool of don't care data registers, to substitute for R3 and obtain the modified emulated sequence of instructions of EXAMPLE 8 according to the embodiment

EXAMPLE 8

| LINE | OP CODE | OPERAND ETC. | COMMENT |
|---|---|---|---|
| Line 1 | ADDC | R1, R2, R20 | R1 + R2 + CARRY |

The following original instruction of EXAMPLE 9, executable with a first instruction set, has a special load instruction that increments the loaded value. The prior art emulated instructions for a different instruction set is in EXAMPLE 10. The emulated instructions, according to the prior art, have more lines and typically uses fixed registers.

EXAMPLE 9

| LINE | OP CODE | OPERAND ETC. | COMMENT |
|---|---|---|---|
| Line 1 | LDm | Rb, Rt | Load and post add 1 to address |

EXAMPLE 10

| LINE | OP CODE | OPERAND ETC. | COMMENT |
|---|---|---|---|
| Line 1 | LD | Rb, Rt | Load |
| Line 2 | ADD | Rb, Rt, R3 | Rb + 1, Rt + 1 |

The above prior art emulated code of EXAMPLE 10 uses three registers, including a new temporary register R3. With the code of EXAMPLE 10, register R3 is corrupted if it contained valid data prior to the ADD. The event of an additional register being used for the emulated sequence of instructions as compared to the registers used by the original sequence of instructions is dynamic execution information. This dynamic execution information is responded to by using the dynamic execution information of the historical record of register usage to modify the emulated sequence of instructions that include the instructions of EXAMPLE 10.

The modification allocates a currently unused register, for example R20 from the pool of registers, to substitute for R3 and obtain the modified emulated sequence of instructions of EXAMPLE 11, according to the embodiment.

EXAMPLE 11

| LINE | OP CODE | OPERAND ETC. | COMMENT |
|---|---|---|---|
| Line 1 | LD | Rb, Rt | Load |
| Line 2 | ADD | Rb, Rt, R20 | Rb + 1, Rt + 1 |

The prior art fixed nature of a hardware translation to an emulated sequence of instructions causes an uneven utilization of machine resources. For example, when one register is repeatedly used for temporary values due to emulation, the instructions that depend upon those values must be executed before the register value is changed and thus the use of out-of-order machines and parallel or multi processing is limited. Stall or WAR hazard may occur. Resolving such dependencies according to the prior art can potentially waste hardware resources. For example such dependencies of the emulated sequence may require that multiprocessing, out-of-order processing, etc. not be used.

When a division (DIV) and an add (ADD) that both use R3 follow each other in an original sequence of instructions in a first instruction set, as in EXAMPLE 12, there is no problem if the instructions are executed in parallel.

EXAMPLE 12

| LINE | OP CODE | OPERAND ETC. | COMMENT |
|---|---|---|---|
| Line 1 | DIV | R1, R2, R3 | result in R3 |
| Line 2 | ADD | R1, R2 | R1 + R2, result in R2 |

However, the emulated sequence of instructions to run with a second instruction set, according to the prior art, uses the register R3 for both the add result and the division result, as in EXAMPLE 13.

EXAMPLE 13

| LINE | OP CODE | OPERAND ETC. | COMMENT |
|---|---|---|---|
| Line 1 | DIV | R1, R2, R3 | result in R3 |
| Line 2 | ADD | R1, R2, R3 | R1 + R2, result in R3 |

The ADD instruction uses R3 as a temporary register. However, since the preceeding DIV is likely to take more machine cycles than the ADD, the value left over from the division may finally get stored incorrectly in R3. If, instead, the ADD used a different temporary register, R20 in this case, then the value in R3 after the execution of both instructions is the result of the ADD, which is the correct value, as in EXAMPLE 13. The embodiment of the present invention generates the modified sequence of instructions of EXAMPLE 14 and the problem is solved.

EXAMPLE 14

| LINE | OP CODE | OPERAND ETC. | COMMENT |
|---|---|---|---|
| Line 1 | DIV | R1, R2, R3 | result in R3 |
| Line 2 | ADDC | R1, R2, R20 | R1 + R2 + result in R20 |

When the embodiment of the present invention generates the emulated sequence of instructions of EXAMPLE 13, with the emulation sequence generator 202, the addition of a new register to the code in emulating line 1 is noted as dynamic execution information by the resource usage 201. The resource usage 201 as a part of the emulator compares the registers of the original sequence of instructions with the registers used by the emulated sequence of instructions. This resource usage is preferably a historical state machine of register usage that keeps a complete history of registers used, for example a separately stored record for each register use, each record including: register identification, for example, R3; the value in the register as a result of the use; a valid flag for such values, which would indicate valid when the value is stored and canceled when the value is last and later used; and possibly the line number and instruction where used in the sequence. This historical record alternatively is kept in a look-up table by software implementation as a usage resource 201.

All registers that do not have their valid flag set, that is that have don't care data, constitute a pool of registers available for rewriting. Some registers may be permanently removed from the pool and the record keeping. The historical state machine of register usage therefore contains dynamic execution information, which is responded to by using the dynamic execution information of the historical record of register usage to modify the emulated sequence of instructions.

The modification of the embodiment involves allocating a currently unused register, for example R20 from the pool of available registers (those not having a valid flag indicating valid data, that is, don't care data registers), to substitute for the register R3. Thus R20 is newly added to the prior art emulated sequence of instructions of EXAMPLE 13, and thereby the embodiment obtains the modified emulated sequence of instructions of EXAMPLE 14.

A branch prediction guesses whether a branch will be taken in a program and fetches code accordingly. When a branch is considered as "likely", the next instruction of the branch sequence is stored in fast memory, such as a cache, and the "next instruction" is therefore ready to be removed from such fast storage to be used the next time a branch, which may or may not be the same branch, is encountered. Thereby there is a prediction as to which way the instruction will branch, which prediction may be correct about 90% of the time. Dynamic branch prediction information is obtained from the branch predictor 203, which according to one embodiment is a branch prediction state machine.

The improved or enhanced branch prediction state machine of the embodiment keeps an historical record of each of all branches at particular addresses and whether or not each of the branches was taken. This historical record alternatively is kept in a look-up table by software implementation as a usage resource 201. The emulated sequence of instructions may have a plurality of branches (by adding branches during emulation or because the original sequence of instructions had a plurality of branches), each having a branch prediction of "unlikely".

For example, the percentage of time each branch is taken may be 40% and accordingly the table sets a branch prediction of "unlikely" for each of the branches. However the embodiment emulator, because of the novel historical record of dynamic branch prediction execution information, determines that the branches of the function as a group. As a specific example, they may function as a group because they branch on the same error condition, so that as a group the branch prediction is likely. Therefore, the embodiment modifies the computer system by changing the branch predictor or by modifying the emulated sequence of instructions to provide a new branch prediction for the group, which prediction is then "likely". For example two branches, adjacent or separated by instructions, have a likelihood of each branch that is 40% and therefore in the prior art is each branch is labeled with a condition code of "unlikely" or merely not flagged as "likely". However, when each of the two branches are controlled by the same condition or each branches to the same address, for example, then the likelihood of branching, for the group of two branches, becomes 96%, which group likelihood is recognized by the embodiment, and then the embodiment modifies the instructions so that each of the branches or one of them has its branch prediction condition code or flag changed to "likely".

The change in condition code or flag as provided by the embodiment is made possible by the generation of the novel historical record of dynamic branch prediction execution information. The historical record of dynamic branch prediction execution information preferably includes a record for each branch, with each record comprising: the branch op code line number, flag or multi-condition code, condition or event implementing the branch and target of the branch, for example. The following is a specific example of use of the historical record of dynamic branch prediction execution information.

The original sequence of instructions includes the following branch instruction of EXAMPLE 15, which was explained previously with respect to EXAMPLE 1.

EXAMPLE 15

| LINE | INSTR. | OPERAND ETC. | FLAG |
|---|---|---|---|
| Line 1 | BT | #disp | //unlikely |
| Line 2 | BT | #disp | //unlikely |

In the EXAMPLE 15, the FLAG specifies the likely flag content provided by the prior art branch predictor. The emulated sequence of instructions obtained from the EXAMPLE 15, according to the prior art, is:

EXAMPLE 16

| LINE | OP CODE | OPERAND ETC. | FLAG |
|---|---|---|---|
| Line 1 | PT | #disp1, TR0 | // unlikely |
| Line 2 | NOP | | |
| Line 3 | BNE | R19, R63, TR0 | // unlikely |

-continued

| LINE | OP CODE | OPERAND ETC. | FLAG |
|---|---|---|---|
| Line 4 | PT | #disp2, TR0 | // unlikely |
| Line 5 | NOP | | |
| Line 6 | BNE | R19, R63, TR1 | // unlikely |

With the embodiment of the invention, the modified emulated sequence of instructions 204 produced from the EXAMPLE 16 by the emulator is:

EXAMPLE 17

| LINE | OP CODE | OPERAND ETC. | FLAG |
|---|---|---|---|
| Line 1 | PT | #disp1, TR0 | // likely |
| Line 2 | NOP | | |
| Line 3 | BNE | R19, R63, TR0 | // likely |
| Line 4 | PT | #disp2, TR1 | // likely |
| Line 5 | NOP | | |
| Line 6 | BNE | R20, R63, TR1 | // likely |

Figure 3:
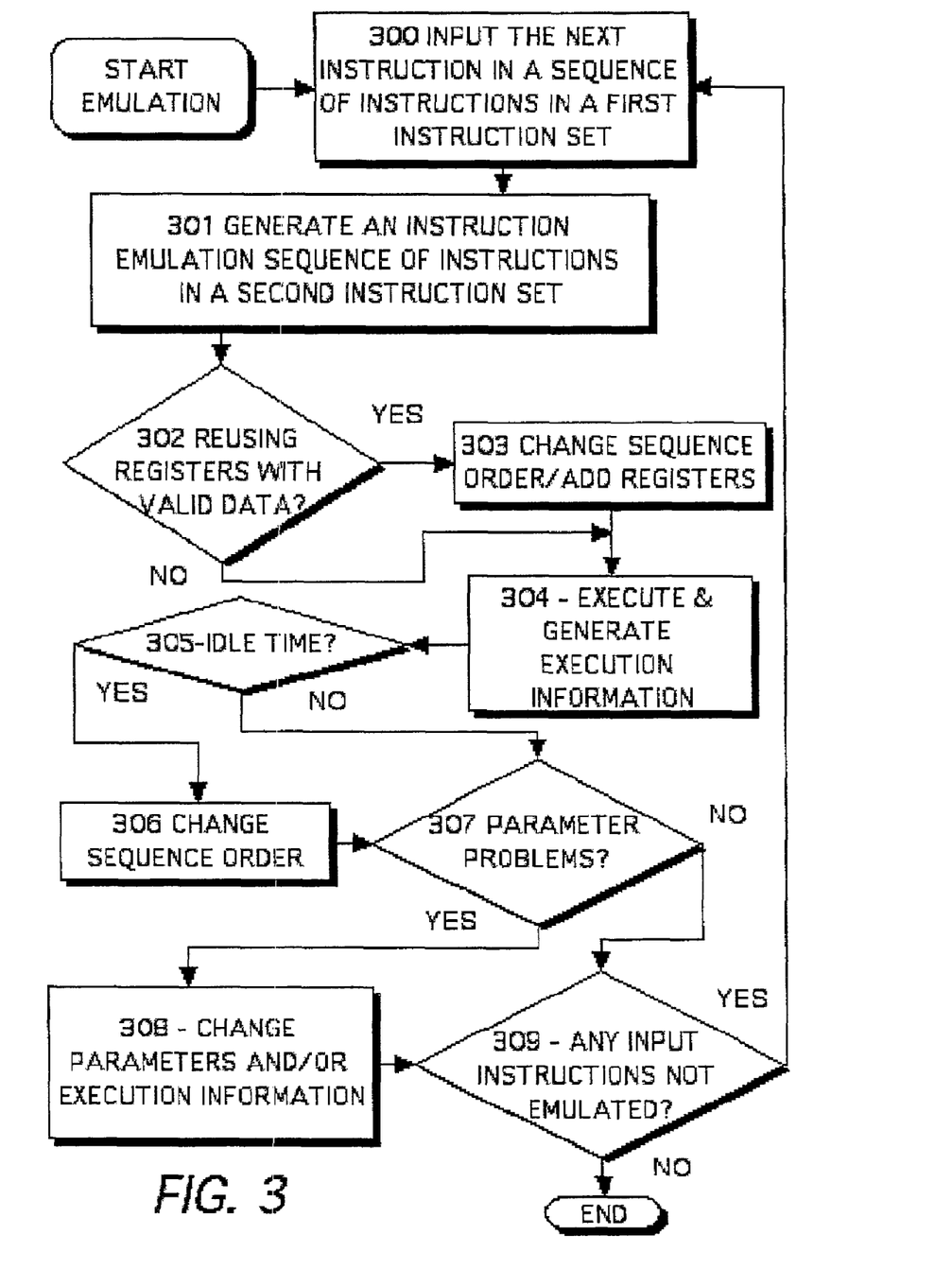
FIG. 3 is a flow chart of the method of operation of the emulator of FIG. 1 operating in the computer system of FIG. 2, applicable to hardware and/or software and/or firmware implementation.

FIG. 3 is a flow chart of the method of operation of the emulator, applicable to hardware and/or software and/or firmware implementation.

Step 300 inputs the next instruction in a sequence of instructions in a first instruction set, which in the example was the BT instruction with parameters of a target address in a PC-relative offset "#disp" and temporary register TR0. This BT input is provided at the input 205 of FIG. 1, which could originate from the devices of FIG. 2, for example at the input 110, at the keyboard 109, as a selection choice displayed on the monitor 108, from cache 105, from ROM 113, from storage 107, from I/O 111, from network 112 in general, or from another computer 300. This instruction, BT, is passed to step 301.

Step 301 generates, in a known manner, an instruction emulation sequence in a second instruction set, which second instruction set is different from the first instruction set from step 300. This instruction emulation sequence in a second instruction set is generated by the emulator 201, 202 and 203 of FIG. 1, the emulator 106 of FIG. 2.

Decision step 302 analyzes the instruction emulation sequence to determine if the parameters have a problem that is evident from the instruction emulation sequence itself or from the dynamic execution information, for example by maintaining information as to the use of temporary registers to see if a register with valid data is being rewritten. For a more specific example, the system determines which of the temporary registers TRn have contents that may be used during the forthcoming execution of the emulation sequence (valid contents) and which of the temporary registers TRn have contents that are not to be used during forthcoming execution of the emulation sequence (don't care contents), so that the former should not be rewritten and the later may be rewritten as further temporary registers TRn are needed. The emulation sequence generator 202, maintains a list of temporary registers TRn, used as scratch registers in the instruction emulation sequence 204. An example list of temporary registers TRn is caller-save registers as defined by an ABI instruction or a subset thereof. The emulation sequence generator 202 uses heuristics that determines which scratch register TR0 is used by the emulation sequence generator 202. When the decision is that the current parameters have no problem, operation proceeds to step 304 for execution of the instruction emulation sequence as a whole or as one instruction at a time. When the decision is that the current parameters have a problem, for example one register in a loop is being used for first and second data with each iteration, operation proceeds to step 303 to solve the problem.

Step 303 solves the problem found in step 302, for example adds a new register so that the first and second data may be in respective registers for each iteration of a loop, to save machine cycles and avoid register conflicts. Also, the problem may be solved by the naming or renaming of temporary registers to avoid register conflict.

The execution, in step 304, generates execution information, such as the likelihood of a branch being taken or idle machine cycles waiting for a result before the next instruction may be executed. The execution information is passed to step 305.

Step 305 determines if the execution information identifies idle cycles and through heuristics determines if the sequence may be changed to move an instruction not needing the results being waited for to a position to precede the instruction waiting to be executed. Thereby, the moved instruction may use the previous idle time of the processor and thus save machine cycles. When the decision is that there is a problem of this type, operation proceeds to step 306 to solve the problem. When the decision is that there is no problem of this type, operation proceeds to step 307.

Step 306 is reached when the answer to the inquires of step 302 is yes and then one or more instructions of the emulation sequence are moved to solve the problem, for example to utilize the formerly idle machine cycles of the processor. Operation then proceeds to step 307.

Step 307 determines if there are further parameter problems as at least partially identified using the execution information from step 304, and when the answer is yes, operation proceeds to step 308 to solve the problems, and if the answer is no, operation proceeds to step 309.

Step 308 solves the problems identified in step 307 by, for example, changing parameters such as registers or changing execution information such as adding an unlikely condition to a flag. These and other examples are more fully set forth elsewhere in this specification. Next, operation is passed to step 309.

Step 309 determines if there are any more input instructions from the first instruction set that are to be emulated, and when the answer is yes, then the control returns to step 300 to input another instruction to be emulated. When the decision reaches a no answer, the emulation is finished and the emulation process ends.

FIG. 3 is an embodiment for illustration of the invention, and the order of step groupings and individual steps may be changed. Also, some of the decision and problem solving pairs may operate in a loop to go through all or many of the instruction emulation sequence of the instructions that have been emulated to date, instead of just those resulting from the emulation of a single instruction from the first instruction set. Further steps 300 and 301 could be completed for the entire sequence of instructions in the first instruction set with the results stored, etc. before starting the steps 302 to 309, the latter step 309 returning to step 302, and in such case the emulation of the present invention would be more specifically referred to as an emulation extension or enhancement.

Figure 4:
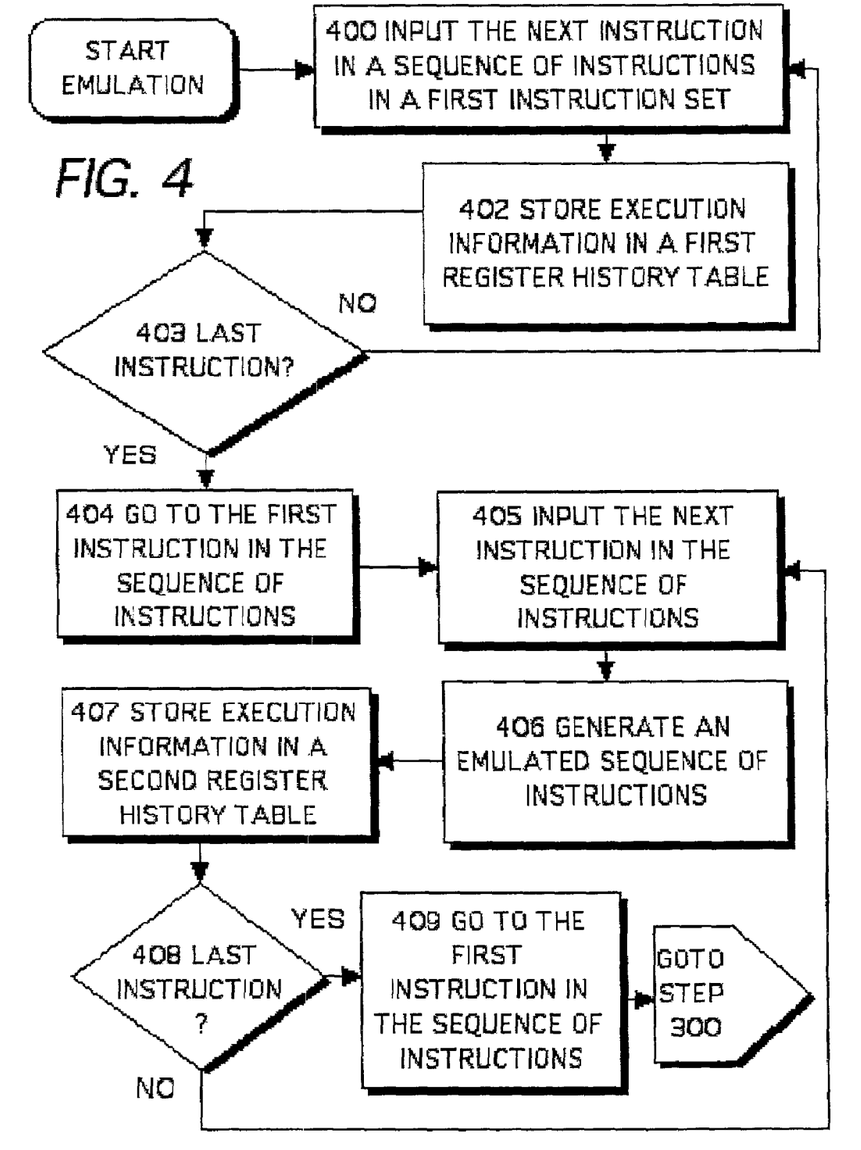
FIG. 4 is a flow chart of the method of generating an historic register usage table used as a usage resource of dynamic execution information with the emulator of FIG. 3.

FIG. 4 is a flow chart of the method of operation of another portion of the emulator embodiment, applicable to hardware and/or software and/or firmware implementation.

Step 400 inputs the next instruction in an original sequence of instructions that are executable with a first instruction set.

Next the instruction input in step 400 is executed in step 402 and dynamic execution information as to each register usage is stored as a separate record in an historical register usage table, comprising fields of: register identity (both for the original and emulated sequences); value stored in that register; identity of the instruction causing the storing; flag as to whether the instruction is an emulated instruction or not (alternatively, separate tables are provided for the original and emulated sequences of instructions); and a valid data flag.

Step 403 determines if there are any more instructions to be input from the original sequence of instructions, and when there are, then the control returns to step 400. When the decision 403 determines that there are no more instructions to be input from the original sequence of instructions control is passed to step 404.

Step 404 returns to the start of the original sequence of instructions and the method proceeds to step 405.

Step 405 inputs the next instruction in the original sequence of instructions that are executable with a first instruction set.

Step 406 generates, in a known manner, an instruction emulation sequence that is executable with a second instruction set, which second instruction set is different from the first instruction set, by using the instruction input from step 405. This emulated sequence of instructions is generated by the emulation sequence generator 202 of FIG. 1, the emulator 106 of FIG. 2.

Next, in step 407, the emulated instruction is executed and dynamic execution information as to each register usage is stored as a separate record in an historical register usage table, comprising fields of: register identity (both for the original and emulated sequences); value stored in that register; identity of the instruction causing the storing; flag as to whether the instruction is an emulated instruction or not (alternatively, separate tables are provided for the original and emulated sequences of instructions); and a valid data flag.

Step 407 further includes the generation of the historical record of dynamic branch prediction execution information, which preferably includes a record for each branch, with each record comprising: the branch op code line number, flag or multi-condition code, condition or event implementing the branch and target of the branch, for example.

Step 408 determines if there are any more instructions to be input from the emulated sequence of instructions, and when there are, then the control returns to step 405 to input another instruction. When the decision 408 determines that there are no more instructions to be input from the original sequence of instructions, control is passed to step 409.

Step 409 returns to the start of the original sequence of instructions and the method proceeds to step 300 of FIG. 3 for modification of the emulated sequence of instructions in response to the entire history of all register usage dynamic execution information that is stored in tables according to steps 402 and 407.

A comparison of the historical record of dynamic branch prediction execution information for original instructions and emulated instructions for various combinations of branches into groups easily determines and identifies when a group of registers may be evaluated more likely than their members to provide a group branch prediction of likely for an improved performance purpose, as explained previously.

A comparison of the historical register usage dynamic execution information for original instructions and emulated instructions easily determines and identifies problems to be solved. For example, when new registers have been added by emulation and if at that time the data that was in the new register was still valid (from when the original sequence of instructions was run), then there is register pollution. The valid data flag will identify registers that have invalid or don't care data and such registers form a pool of registers that may be used in the process of FIG. 3, for allocating new registers when emulation is again performed for the original sequence of instructions. The historical register usage dynamic execution information in the tables as generated by the method of FIG. 4 is particularly useful with respect to the following examples, as well with respect to an improved usage resource for the previous examples.

With the present invention, wherein the instruction parameters are changed dynamically to make some instructions independent in position from other instructions within the instruction emulation sequence, for example in the EXAMPLE 5, the instruction emulation sequence may be executed substantially simultaneously with its generation or on a substantially real time basis. Therefore it is seen that the execution of instructions may be in a different order than they would be executed with the prior art emulation where emulation does not dynamically change parameters and permits position change of instructions by the processor during execution.

The embodiments may be used when a program is emulated and compiled, or re-emulated and recompiled or as a part of run-time optimization.

This invention is useful in efficiently emulating instructions by dynamically modifying a component of the computer system, for example the parameters of the instruction emulation sequence, particularly at run-time. This invention is particularly useful in combination with processors (such as microprocessors, scalar processors and out-of-order processors) and their systems that emulate one or more unimplemented instructions, in hardware or software. Such uses include compatibility instruction emulation as well as emulation to support programs written for other target hardware (like Java byte codes). Hardware and firmware implementation is particularly advantageous, because the cost is modest, the speed is improved and there would be no or little software cost.

While the present invention has been described in connection with a number of embodiments, implementations, modifications and variations that have advantages specific to them, the present invention is not so limited but covers various obvious modifications and equivalent arrangements according to the broader aspects, which fall within the spirit and scope of the following claims.

What is claimed is:

1. A method performed by a computer system having a hardware emulation, said method comprising the steps of:
   obtaining a first set of one or more emulated instructions derived from an original set of one or more instructions using the hardware emulation;
   initiating execution of the first set of one or more emulated instructions;
   producing first dynamic execution information in response to executing the first set of one or more emulated instructions; and
   changing the hardware emulation dynamically for producing a second set of one or more emulated instructions by modifying at least a parameter of one instruction of the first set of one or more emulated instructions in response to said first dynamic execution information, said step of changing, includes software producing multiple conditions codes that replace a single condition code of the first dynamic execution information.

2. The method of claim 1, wherein:

said step of changing, includes modifying at least a register field of one instruction of the first set of one or more emulated instructions.

3. The method of claim 1, wherein:

said steps of executing, producing and changing are conducted recursively on at least some of successive segments of the first set of one or more emulated instructions.

4. The method of claim 1, wherein:

said step of producing, produces branch prediction information; and said step of changing, changes condition codes of the branch prediction information.

5. The method of claim 1, wherein:

said step of producing, produces a history of register allocation information; and said step of changing, changes register allocation.

6. The method of claim 1, wherein:

said step of producing, produces a history of branch prediction dynamic execution information; and said step of changing, generates a branch prediction likelihood code for a group of branches that may be different from any branch prediction of the members of the group.

7. The method of claim 1, wherein:

said step of modifying at least a parameter of one instruction of the first set of one or more emulated instructions, includes modifying a plurality of parameters of some instructions of the first set of one or more emulated instructions.

8. A method performed by a computer system, said method comprising the steps of:

obtaining an emulated sequence of instructions derived from an original sequence of instructions;

initiating execution of the emulated sequence of instructions;

producing first dynamic execution information in response to executing the emulated sequence of instructions; and changing the computer system dynamically to produce different dynamic execution information in response to said first dynamic execution information;

wherein said step of changing, includes software producing multiple conditions codes that replace a single condition code of the first dynamic execution information.

* * * * *

UNITED STATES PATENT AND TRADEMARK OFFICE
CERTIFICATE OF CORRECTION

PATENT NO. : 7,251,594 B2 Page 1 of 1
APPLICATION NO. : 10/029497
DATED : November 2, 2007
INVENTOR(S) : Sivaram Krishnan It is certified that error appears in the above-identified patent and that said Letters Patent is hereby corrected as shown below:

On the Title page, below the Inventor information change the Assignee to read:

--(73) Renesas Technology Corporation, Tokyo (JP)--

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

PATENT NO.      : 7,251,594 B2  
APPLICATION NO. : 10/029497  
DATED           : July 31, 2007  
INVENTOR(S)     : Sivaram Krishnan Page 1 of 1

It is certified that error appears in the above-identified patent and that said Letters Patent is hereby corrected as shown below:

On the Title page, below the Inventor information change the Assignee to read:

--(73)   Renesas Technology Corporation, Tokyo (JP)--

This certificate supersedes the Certificate of Correction issued November 11, 2008.

Signed and Sealed this

Ninth Day of December, 2008

JON W. DUDAS  
*Director of the United States Patent and Trademark Office*